United States Patent

Palm et al.

[11] 4,320,012
[45] Mar. 16, 1982

[54] NEUTRALIZATION OF PHOSPHORIC ACID WASTE WATERS

[76] Inventors: Gordon F. Palm; R. George Hartig, both of 602 Schoolhouse Rd., Lakeland, Fla. 33803

[21] Appl. No.: 175,966

[22] Filed: Aug. 7, 1980

Related U.S. Application Data

[63] Continuation-in-part of Ser. No. 5,581, Jan. 22, 1979, abandoned.

[51] Int. Cl.$^3$ .............................................. C02F 1/52
[52] U.S. Cl. .................................. 210/713; 210/724; 210/906; 210/915; 423/163; 423/321 R
[58] Field of Search ............... 423/158, 160, 163, 167, 423/305, 321; 210/702, 713, 711, 710, 724, 726, 906, 907, 915

[56] References Cited

U.S. PATENT DOCUMENTS

| | | |
|---|---|---|
| 3,493,340 | 2/1970 | Bosen et al. .......................... 210/915 |
| 3,650,686 | 3/1972 | Hudson et al. ....................... 210/915 |
| 3,725,265 | 4/1973 | Legal, Jr. ............................. 210/915 |

FOREIGN PATENT DOCUMENTS 51-38297 3/1976 Japan .................................. 210/915

OTHER PUBLICATIONS

Mooney, G. A. et al.; "Removal of Fluoride and Phosphorus from Phosphoric Acid Wastes with Two Stage Line Treatment"; Proceed of the 33rd Ind. Waste Conf., Purdue Univ., (1978).

Mooney et al.; "Laboratory and Pilot Treatment of Phosphoric Acid Wastewaters"; presented at the A.I.C.E., 1977, Joint Meeting of Central Fla. and Peninsular, Florida.

Primary Examiner—Benoit Castel
Attorney, Agent, or Firm—Carl B. Fox, Jr.

[57] ABSTRACT

Method for neutralizing waste cooling pond waters of wet process phosphoric acid plants, and for neutralizing similar waste waters from phosphate complexes, wherein neutralization is performed in two stages and wherein the flocculent precipitate from the second neutralization stage is disposed of by dissolving it in incoming untreated waste water prior to the first neutralization stage. Neutralization in the first neutralization stage is accomplished by addition of limestone to the waste water, and neutralization in the second neutralization stage is accomplished by addition of limestone to the water phase from the first neutralization stage. The precipitate from the first neutralization stage is readily separable from the liquid phase, and is suitable for disposal in the gypsum stack of a wet process phosphoric acid plant. The fully neutralized water meets federal and state requirements for disposal in surface and underground water systems as to pH and as to fluoride and phosphate content. Lime, instead of limestone, may be used for neutralization in the first neutralization stage, but this procedure will increase operating costs somewhat in most cases.

6 Claims, 2 Drawing Figures

NEUTRALIZATION OF PHOSPHORIC ACID WASTE WATERS

This application is a continuation-in-part of application Ser. No. 5,581, filed Jan. 22, 1979, now abandoned.

BACKGROUND OF THE INVENTION

In phosphate complexes of the type for manufacture of wet process phosphoric acid and sometimes also for manufacture of phosphate chemicals utilizing phosphoric acid in their manufacture, water is employed as a coolant for gas streams created within the complex. The cooling water absorbs and dissolves various materials, and is sent to a pond for cooling. Typical pond water will have a pH in the range from about 1.5 to about 2.0, more or less, typical cooling pond water compositions and characteristic being shown in Table 1.

TABLE 1
TYPICAL COOLING POND WATER CHARACTERISTICS

| Parameter | Range* |
| --- | --- |
| pH, Standard Units | 1.8–2.1 |
| Total Acidity, as $CaCO_3$ | 20,000–40,000 |
| Fluoride, as F | 4,000–8,000 |
| Phosphorus, as P | 4,000–8,000 |
| Silicon, as Si | 1,000–3,000 |
| Total Solids | 20,000–40,000 |
| Total Suspended Solids | 50–250 |
| Conductivity, umhos | 15,000–30,000 |
| Chlorides, as Cl | 50–250 |
| Sulfates, as $SO_4$ | 2,000–8,000 |
| Sodium, as Na | 50–3,000 |
| Calcium, as Ca | 50–150 |
| Magnesium, as Mg | 50–300 |
| Aluminum, as Al | 50–400 |
| Chrome, as Cr | 0.2–2.0 |
| Zinc, as Zn | 1.0–5.0 |
| Iron, as Fe | 100–250 |
| Manganese, as Mn | 5–30 |
| $NH_3$—N, as N | 0–1,200 |
| Total Organic N, as N | 3–30 |
| Color, APHA units | 1,000–4,000 |

*All values expressed as mg/l unless otherwise noted

Various federal and state agencies have established limits for fluoride and phosphorus compositions in waste waters to be disposed of. The limits vary somewhat from area to area, but the average limits are about 25 mg/l for fluorides and about 35 mg/l for phosphorus. Water containing an excess of either or both of fluorides and phosphorus may not be disposed of either into surface waters or into underground water disposal areas.

To remove fluoride and phosphorus components of waste cooling pond water, it is necessary to neutralize the water in order to precipitate fluoride and phosphate salts. Methods have been proposed and used wherein limestone and lime are used in a first neutralization stage, and lime alone is used in a second neutralization stage. These methods were described in a presentation by G. A. Mooney, A. T. Nogueira, and C. G. Thompson at the 1977 joint meeting of the Central Florida and Peninsular Florida sections of the American Institute of Chemical Engineers, May 20–22, 1977, the presentation being contained in a printed report of the presentation. While these methods reduce the fluoride and phosphate compositions of the waters to satisfactorily low levels, there are precipitates created which are disposed of in settling ponds, at least one for each stage of neutralization. This invention seeks to provide improved methods for neutralizing waste pond waters from wet process phosphoric acid manufacture and to simplify operation of plants incorporating the same, by eliminating conventional settling ponds for disposing of precipitants resulting from the neutralization by disposing of the precipitates in a gypsum stack, and from fully meeting the requirements of federal and state regulations. Conventional settling ponds, at least one for each stage of neutralization, eventually fill with solids and require periodic cleaning at great expense. Large land areas, five to twenty acres, are required for these ponds but are not generally available at many operational sites at reasonable cost or in close proximity to operations.

SUMMARY OF THE INVENTION

The invention provides methods for neutralization of waste cooling pond waters and other similar waste waters from wet process phosphoric acid plants and phosphate complexes. The acidic water is neutralized in two stages, first by addition of finally divided limestone ($CaCO_3$) to raise the pH of the water from an initial pH of about 1.5 to 2.0 to a pH of about 4, more or less. Solids precipitated by the neutralization are separated. The water from the first neutralization is further neutralized by addition of slaked lime (CaO) to a pH of about 9 to 10. From this second neutralization, a flocculent precipitant is obtained which is separated as a water slurry and is recirculated to be mixed with waste water to be neutralized in the first neutralization. In this way, the second precipitate is readily disposed of by addition to the incoming water to be treated, in which it readily dissolves. The water from the second neutralization has reduced compositions of fluorides and phosphorus well under the limits prescribed by federal and state reulatory agencies, and may be easily and economically disposed of. The precipitate from the first neutralization is of composition and characteristics such that it may be disposed of in the gypsum stack of the wet process phosphoric acid plant, so that it, too, is readily disposed of without substantial and costly treatments, and handling.

In view of the fact that a substantial proportion of the neutralization of the waste cooling pond water, or other similar waste water, is accomplished through use of limestone, which is less costly than lime, the economics of the process are good and are substantially lower than the cost when other procedures are followed.

According to one embodiment of the invention, the recirculated solids slurry from the second neutralization is mixed with the incoming waste to be treated in a separate reactor. According to a second embodiment, the process is made more economical by elimination of one reactor by admixing the recirculated solids slurry from the second neutralization in a line mixer disposed ahead of the first neutralization reactor.

A principal object of the invention is to provide methods for treating waste cooling pond waters from wet process phosphoric acid manufacture. Another object of the invention is to provide such methods wherein neutralization is accomplished in two stages, first by neutralization with water-slurried subdivided limestone, and second, by neutralization with slaked lime. Yet another object of the invention is to provide such methods wherein the resulting precipitates are readily and economically disposed of. In accordance therewith, an object of the invention is to provide methods wherein the flocculent precipitate resulting from the second neutralization is redissolved in the incoming water to be treated whereby it requires no substantial cost or procedures for its disposal. A further object of the invention is to provide such methods wherein the precipitate from the process may be disposed of in the gypsum stack of a wet process phosphoric acid, thereby eliminating conventional settling ponds. A further object of the invention is to provide such methods which are simple in operation and are economical.

Other advantages and objects of the invention will appear from the following descriptions of preferred embodiments, reference being made to the accompanying drawings.

BRIEF DESCRIPTIONS OF THE DRAWINGS

DESCRIPTION OF THE PREFERRED EMBODIMENT

Figure 1:
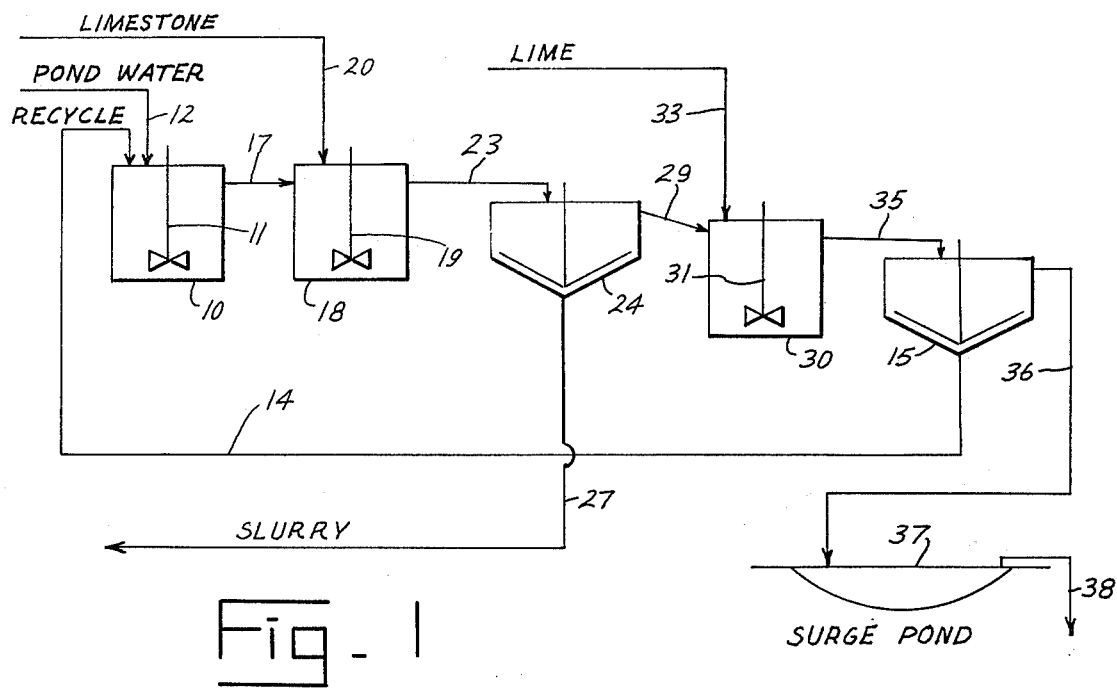
FIG. 1 is a schematic flow diagram showing a preferred method according to the invention.

Referring now to the drawings in detail, and first to FIG. 1, there is shown a first reactor 10, having an agitator 11, into which is delivered waste cooling pond water from a wet process phosphoric acid plant, same being delivered through conduit 12. A recycled solids slurry is added to reactor 10 by way of conduit 14 which leads from the bottom portion of a settler or thickener 15. In reactor 10, the cooling pond water and recycled materials are agitated to provide a uniform mixture, the solids in the recycled solid slurry delivered through conduit 14 being very rapidly dissolved. Overflow from reactor 10 is passed through conduit 17 to a second reactor 18, having agitator 19, into which sufficient limestone is introduced through conduit 20 to bring the pH to about 3.0 to about 4.5.

Screen size analysis of the limestone is shown in Table 2. The screen size analysis is exemplary only, being the form of limestone employed in the examples to follow. Any suitable limestone material in subdivided form sufficiently small for efficient reaction may be used.

TABLE 2

| MESH (Openings per Square Inch) | % RETAINED |
| --- | --- |
| 40 | 0.13 |
| 48 | 0.23 |
| 65 | 0.19 |
| 100 | 0.89 |
| 150 | 1.53 |
| 200 | 5.45 |
| 325 | 16.42 |
| −325 | 75.16 |

The limestone is preferably added through conduit 20 in the form of a water slurry, a slurry containing 50% limestone by weight being entirely satisfactory, but other slurries being satisfactory so long as they may be readily pumped through conduit 20 to reactor 18. Although more difficult to handle, the subdivided limestone may be added directly into reactor 18. The retention time in reactor 18 may be any time sufficient for adequate reaction to occur, a retention time of about one hour having been found to be satisfactory. Different retention times may be used so long as the neutralization reaction is allowed to proceed substantially to completion.

The reactor slurry from reactor 18 is overflowed through conduit 23 to settler or thickener 24. Settler 24 is of sufficient size that adequate settling of the precipitate occurs. The precipitate is the reaction product between limestone ($CaCO_3$) and the phosphorus, fluoride and other materials in the cooling pond water. No accurate composition for the precipitated materials may be given, since they are complex mixtures of variable compositions, the principal cation of course being calcium and the anions being various forms of phosphates, acid phosphates, silicates, fluosilicates, fluorides, and the like. The average retention time in settler 24 may be up about two hours, this time being variable depending on the characteristics of the precipitates, so that it may vary considerably from the two hour retention time mentioned.

The settled solids from settler 24 are, with the water solution contained therewith, delivered through conduit 27 for disposal. As has been previously mentioned, the slurry may be disposed of by pumping it to a gypsum stack, a gypsum stack being present in connection with every wet process phosphoric acid operation, or the slurry may be stored in a storage pond. The storage pond may be cleaned periodically by digging out the settled solids therefrom with a dragline or other excavating equipment.

Liquid overflow from settler 24 passes through conduit 29 to a reactor 30 having an agitator 31. A slaked lime slurry is introduced to reactor 30 through conduit 33. The lime may conveniently be introduced in the form of a 10% lime (by weight) slurry with water. In reactor 30, sufficient lime is added to bring the pH of the water to the range of about 9.0 to about 10.0. The final pH to which the water is brought in reactor 30 may vary somewhat from this range, but in this range optimum fluoride and phosphates removal from the water is obtained, and the amount of precipitates obtained for recycling to reactor 10 is satisfactory.

Slurry from reactor 30 is overflowed through conduit 35 to settler or thickener 15, previously referred to. The retention time in settler 15 may satisfactorily be up to about four hours, but depending upon the nature of the precipitate, this time may vary. The retention time required, of course, is that which will produce a clear effluent from the settler.

Clear water overflow from settler 15 is passed through conduit 36 to a surge pond 37, from which it flows through a suitable conduit system 38 for disposal, or perhaps for use. The pH of the water in conduit 38 will preferably be in the range from about 9.0 to about 10.0. The amount of fluorine (F) remaining in the partly neutralized water may range from near zero to about twenty parts per million.

Most of the fluorine and phosphorus present in the pond water feed to the first neutralizing stage are ultimately removed as solids in the underflow conduit 27 of the first stage settler 24, and is pumped to the gypsum stack or settling ponds.

The treated effluent overflows from the second stage settler 15 and is carried by conduit 36 to the surge pond 37. The fluorine content of this liquid is reduced to 20 PPM (0.002%) and the phosphorus content as $P_2O_5$ is reduced to 16 PPM (0.0016%), or less.

These are the only two streams leaving the neutralizing system. The solids slurry underflow from second stage settler 15 is recycled to first stage mixer 10.

Laboratory analyses of waters treated in accordance with the invention are shown in Tables 3 and 3A in connection with examples of such treatment.

Figure 2:
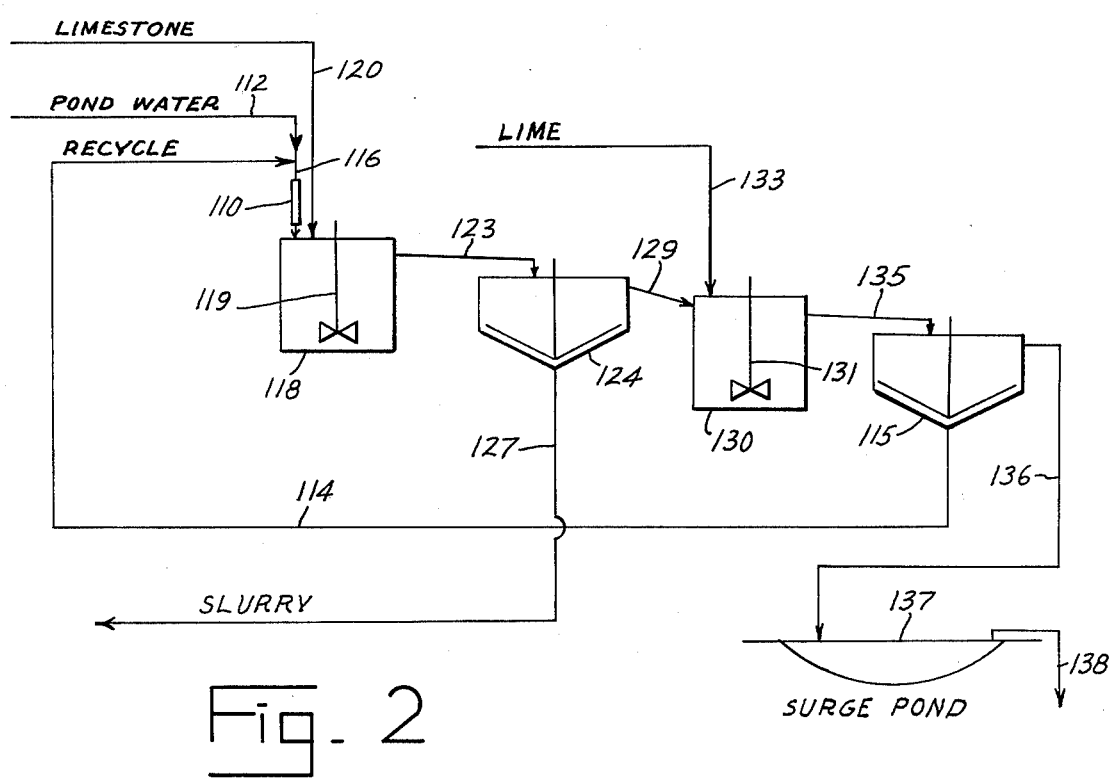
FIG. 2 is a schematic flow diagram showing a second preferred method according to the invention.

Referring now to FIG. 2 of the drawings, showing a modified form of the method, a reactor 118 having agitator 119 receives limestone through conduit 120, pond water to be treated through conduit 112, and recycled solid slurry from settler 115 through conduit 114. There is no reactor equivalent to reactor 10 of FIG. 1, this reactor being replaced by an in-line mixer 110 provided in a conduit 116 which receives the flows from conduits 112 and 114. The untreated pond water in conduit 112 and the recycled water slurry containing the precipitate from settler 115 pass through in-line mixer 110 before introduction into reactor 118. Since it has been found that the flocculent precipitate from settler 115 readily dissolves in untreated pond water, the precipitate is at least largely if not completely dissolved before the mixture passing through the in-line mixer reaches reactor 118.

Beyond reactor 118, the method or process is the same as has been described, and the elements shown in FIG. 2 are referred to by reference numerals greater by 100 than the reference numerals used in FIG. 1 for the same elements.

The results of laboratory performances of the method are summarized in Tables 3 and 3A. In the case of each test operation, a starting volume of untreated cooling pond waste water of 1,000 cubic centimeters was employed. The amounts of limestone and lime used are shown in Table 3. Various steps of the method are varied somewhat in the test operations, the optimum operating conditions being determined from the results of the tests. In each case, a measured amount of water-slurried subdivided limestone was added to a measured volume of untreated cooling pond water and agitated. The agitation for each test was maintained for the mixing time shown in Table 3, after which the solids were allowed to settle for the time period indicated. The solids were separated in the form of a slurry and analyzed, the results of analysis being shown in Table 3A. The supernatant liquid was treated with the amount of slaked lime shown in Table 3, slurried with water in a slurry containing 10% solids by weight. Again, the reaction mixture was agitated for the period of time indicated in Table 3 after which settling was permitted for the time shown. Recycled slurry of the type recovered from the second settling stage was added to the incoming untreated cooling pond water in each case in the volume shown in Table 3. The flocculent solids from the slurry dissolved in the pond water, as has been previously described. The analysis of the finally treated water is also shown in Table 3A.

Also shown in Table 3A are analysis of the settled solids from each of the neutralization stages.

TABLE 3

TWO STAGE NEUTRALIZATION TEST RESULTS
STAGE A: RECYCLE SOLIDS FROM STAGE 2 + LIMESTONE NEUTRALIZATION
STAGE B: LIME NEUTRALIZATION

| DESCRIPTION | 1 A 1 | 1 B 2 | 2 A 1 | 2 B 2 | 3 A 1 | 3 B 2 | 4 A 1 | 4 B 2 | 5 A 1 | 5 B 2 | AVG A 1 | AVG B 2 |
|---|---|---|---|---|---|---|---|---|---|---|---|---|
| POND H$_2$O: % P$_2$O$_5$ | 1.08 | — | 1.08 | — | 1.08 | — | 1.08 | — | 1.08 | — | | |
| % F | 0.79 | — | 0.79 | — | 0.79 | — | 0.79 | — | 0.79 | — | | |
| STARTING LIQUOR VOLUME, CC | 1,000 | | 1,000 | | 1,000 | | 1,000 | | 1,000 | | | |
| SLURRY RECYCLE, CC | 160 | | 90 | | 100 | | 300 | | 170 | | | |
| SLURRY SOURCE | * | | 1B | | 2B | | 3B | | 4B | | | |
| FINAL pH (Exp.) | 4.2 | 7.8 | 3.8 | 8.0 | 3.1 | 10.1 | 4.2 | 10.7 | 4.1 | 10.7 | | |
| LIMESTONE USED CaCO$_3$(100% Basis) (GRAMS) | 28.2 | — | 24.5 | — | 19.8 | — | 20.3 | — | 23.6 | — | | |
| LIME USED Ca(OH)$_2$, GMS. | | 5.3 | | 5.8 | | 12 | | 6.0 | | 6.0 | | |
| MIXING TIME, HRS. | 1.0 | 1.0 | 1.0 | 1.0 | 1.0 | 1.0 | 1.0 | 2.0 | 1.0 | 1.0 | | |
| SETTLING TIME, HRS. | 2.0 | 16 | 2 | 16 | 2 | 16 | 16 | 60 | 2 | 16 | | |
| SETTLED SLURRY LIQUID, CC | 960 | 850 | 1,000 | 790 | 890 | 630 | 940 | 610 | 910 | 620 | | |
| SLURRY, CC | 190 | 120 | 165 | 130 | 210 | 350 | 210 | 200 | 240 | 200 | | |
| % SLURRY, VOL.[1] | 19.0 | 12.3 | 16.5 | 14.1 | 21.0 | 35.3 | 19.3 | 24.7 | 20.9 | 24.4 | 17.8 | 22.2 |

NOTES:
[1]Corrected for Stage 2 based on using all the supernatant liquid from Stage 1 and reported as volume % of initial volume in Stage 1 without recycle
*From prior test without solids recycling

TABLE 3A

TWO STAGE NEUTRALIZATION TEST RESULTS
STAGE A: RECYCLE SOLIDS FROM STAGE 2 + LIMESTONE NEUTRALIZATION
STAGE B: LIME NEUTRALIZATION

| DESCRIPTION | 1 A 1 | 1 B 2 | 2 A 1 | 2 B 2 | 3 A 1 | 3 B 2 | 4 A 1 | 4 B 2 | 5 A 1 | 5 B 2 | AVG A 1 | AVG B 2 |
|---|---|---|---|---|---|---|---|---|---|---|---|---|
| LABORATORY ANALYSIS LIQUID PHASES | | | | | | | | | | | | |
| F, ppm | 19 | 12 | 16 | 14 | 1,350 | 15 | — | 6 | 19 | 3 | | |
| P$_2$O$_5$, ppm | 7,730 | 449 | 15,000 | 528 | 11,260 | 30 | | 28 | 8,410 | 16 | | |
| P, ppm(Calculated) | 3,375 | 196 | 6,549 | 231 | 4,916 | 13 | | 12 | 3,671 | 2.6 | 4,628 | |
| pH | 4.3 | 8.0 | 3.9 | 7.9 | 3.1 | 10.0 | 4.0 | 9.7 | 4.1 | 9.4 | | |

TABLE 3A-continued
TWO STAGE NEUTRALIZATION TEST RESULTS
STAGE A: RECYCLE SOLIDS FROM STAGE 2 + LIMESTONE NEUTRALIZATION
STAGE B: LIME NEUTRALIZATION

| | | | | | | TEST NO. | | | | | | |
|---|---|---|---|---|---|---|---|---|---|---|---|---|
| | 1 | | 2 | | 3 | | 4 | | 5 | | AVERAGES | |
| | | | | | STAGE | | | | | | | |
| DESCRIPTION | A 1 | B 2 | A 1 | B 2 | A 1 | B 2 | A 1 | B 2 | A 1 | B 2 | A 1 | B 2 |
| CLARITY LIQUOR | SL Turbid | Turbid | SL Turbid | Turbid | Turbid | Clear | — | Clear | — | Clear | | |
| SETTLED SOLIDS | | | | | | | | | | | | |
| Sp. Gr. | 1.15 | — | 1.18 | — | — | — | 1.11 | 1.07 | 1.12 | — | 1.14 | |
| % Solids | 19.0 | — | 21.0 | 14.5 | — | — | 18.1 | 7.4 | 14.3 | 8.6 | 18.1 | |
| % C$_a$O | — | — | 10.06 | 4.84 | — | — | 8.54 | 2.86 | 6.79 | 3.25 | | |
| % SiO$_2$ (As-Is Slurry) | — | — | 1.49 | 3.51 | — | — | 1.66 | 1.10 | 1.18 | 1.27 | | |
| % F (As-Is Slurry) | — | — | 4.10 | 0.21 | — | — | 3.8 | 0.10 | 2.9 | 0.35 | | |
| % P$_2$O$_5$ (As-Is Slurry) | — | — | 4.25 | 5.39 | — | — | 3.96 | 3.01 | 2.9 | 3.15 | | |
| % C$_a$O | | | 47.9 | 33.4 | | | 47.2 | 38.7 | 47.5 | 37.8 | 47.5 | 36.6 |
| % SiO$_2$ (Dry Calculated) | | | 7.1 | 24.2 | | | 9.2 | 14.9 | 8.3 | 14.7 | 8.2 | 17.9 |
| % F (Dry Calculated) | | | 19.5 | 1.5 | | | 21.0 | 1.4 | 20.2 | 4.1 | 20.2 | 2.3 |
| % P$_2$O$_5$ (Dry Calculated) | | | 20.2 | 37.2 | | | 21.9 | 40.7 | 20.2 | 36.7 | 20.8 | 38.2 |

The test results indicate that in the first neutralization stage the final pH should be in the neighborhood of 3.0 to 4.0, and that the final pH from the second neutralization stage should be in the range from 9.0 to 10.0 if optimum results are to be obtained. Operation outside of the optimum ranges will give satisfactory results.

In view of the fact that, according to the method, a substantial degree of the neutralization is performed by use of limestone as the neutralizing agent, the amount of lime used for neutralization is reduced, as compared with other methods such as that shown in the Mooney et al. article hereinbefore referred to. The neutralization performed utilizing a relatively smaller proportion of lime causes the cost of the overall process to be reduced. The economics of the method are further enhanced by the fact that no storage pond or other facility is required for storage of the solids from the second neutralization stage, these solids being returned in slurry form to be admixed with the incoming untreated cooling pond water, and thereby disposed of automatically. The precipitate from the first neutralization stage is largely crystalline and easily separated from the water, and is readily disposed of by delivery to the gypsum stack of the plant. The methods thereby provide efficient and economical neutralization of cooling pond waste water in a manner never heretofore obtained.

While limestone is advocated for use as the neutralizing agent in the first neutralization stage, lime may be used as the neutralizing agent in both neutralization stages. This use of lime will increase costs of operation whenever lime is more expensive than limestone. Operation is the same whether limestone or lime is used in the first neutralization stage.

While preferred embodiments of the method have been described and shown in the drawings, many modifications thereof may be made by a person skilled in the art without departing from the spirit of the invention and it is intended to protect by Letters Patent all forms of the invention falling within the scope of the following claims.

We claim:

1. Method for neutralization of acidic waste waters from phosphate plants to produce treated water suitable for disposal or use, said waste waters being acidic, having a pH in the range 1.5 to 2.1, and containing fluoride and phosphate materials in solution, comprising partially neutralizing said waste waters by adding one or more chemicals selected from the group consisting of calcium carbonate and calcium oxide to said waste waters to raise the pH thereof to the range 3.0 to 4.5 and to precipitate a substantial portion of said fluoride and phosphate materials therefrom as a non-flocculent first precipitate, separating said first precipitate from the resulting liquid phase, and finally neutralizing said liquid phase by adding calcium oxide to said liquid phase to further raise the pH thereof to the range 6.0 to 12.5 and to precipitate a substantial portion of said phosphate materials therefrom as a flocculent second precipitate and to produce treated water, said flocculent second precipitate being suspended in said treated water and difficult to separate therefrom, thickening said suspension of treated water and flocculent second precipitate to produce clarified treated water and a thickened slurry of flocculent second precipitate in treated water, and avoiding separation of said treated water and flocculent second precipitate from said thickened slurry by recirculating all of said thickened slurry for admixture to additional waste water at said pH in the range 1.5 to 2.1 prior to said addition of said selected one or more chemicals thereto whereby said flocculent second precipitate is redissolved in said waste water to be no longer present as solids requiring separation and said treated water in said thickened slurry being ultimately recovered as said clarified treated water without the necessity for undertaking the difficult separation of treated water and said flocculent second precipitate, the recirculated materials of said second precipitate being increased in concentration in said waste water to which they are added and being separated from the process as a portion of said first precipitate.

2. Method according to claim 1, wherein said partial neutralization of said waste waters raises the pH thereof to approximately 4.0, and wherein said final neutralization further raises the pH of said liquid phase to between about 9.0 and about 10.0.

3. Method according to claim 1, wherein said method is operated on a continuous basis, said recirculated thickened slurry being continuously added to incoming waste waters to form a mixture, said selected one or more chemicals being continuously added to said mixture, said first precipitate being continuously separated from said liquid phase, said calcium oxide being continuously added to said separated liquid phase, said thickened slurry being continuously separated from said clarified treated waters, and said clarified treated waters being continuously withdrawn for disposal or use.

4. Method according to claim 3, wherein said recycled thickened slurry and said incoming waste waters are mixed in separate tank means prior to said partial neutralization thereof.

5. Method according to claim 3, wherein said recycled thickened slurry and said incoming waste waters are mixed in a line mixer prior to said partial neutralization thereof.

6. Method according to claim 1, 2, 3, 4, or 5, wherein said selected one or more chemicals are added in the form of a water slurry, and wherein said calcium oxide is added in the form of a water slurry of slaked lime.

* * * * *

UNITED STATES PATENT OFFICE
CERTIFICATE OF CORRECTION

PATENT NO. : 4,320,012
DATED : MARCH 16, 1982
INVENTOR(S) : GORDON F. PALM and R. GEORGE HARTIG It is certified that error appears in the above-identified patent and that said Letters Patent are hereby corrected as shown below:

In the ABSTRACT, line 11, change "limestone" to --lime--.

Column 2, line 4, change "from" to --by--.

Column 3, line 4, after "acid" insert --plant--.

Column 4, line 10, between "up" and "about" insert --to--.

Signed and Sealed this

Thirteenth Day of July 1982

[SEAL]

Attest:

Attesting Officer

GERALD J. MOSSINGHOFF

Commissioner of Patents and Trademarks